United States Patent [19]
Feigel et al.

[11] Patent Number: 5,769,509
[45] Date of Patent: Jun. 23, 1998

[54] BRAKE UNIT FOR MOTOR VEHICLES WITH ELECTRIC DRIVE

[75] Inventors: Hans-Jörg Feigel, Rosbach v.d.H.; Johannes Gräber, Eschborn; Dieter Kircher, Bad Vilbel; Thomas Berthold, Darmstadt, all of Germany

[73] Assignee: ITT Automotive Europe GmbH, Frankfurt, Germany

[21] Appl. No.: 545,749

[22] PCT Filed: Apr. 28, 1994

[86] PCT No.: PCT/EP94/01341

§ 371 Date: Nov. 1, 1995

§ 102(e) Date: Nov. 1, 1995

[87] PCT Pub. No.: WO94/25322

PCT Pub. Date: Nov. 10, 1994

[30]    Foreign Application Priority Data

May 3, 1993 [DE] Germany .......................... 43 14 448.9

[51] Int. Cl.$^6$ .................................. B60T 8/00; B60L 7/26
[52] U.S. Cl. ................................. 303/152; 303/3
[58] Field of Search ............................ 303/3, 15, 116.1, 303/116.2, 152; 180/65.1–65.4, 65.8, 165

[56]    References Cited

U.S. PATENT DOCUMENTS

| | | | |
|---|---|---|---|
| 3,621,929 | 11/1971 | Oberthur et al. | 303/3 |
| 4,270,806 | 6/1981 | Venkaperumal et al. | 303/3 |
| 4,769,989 | 9/1988 | Ostwald et al. . | |
| 4,962,969 | 10/1990 | Davis | 303/152 |
| 5,253,929 | 10/1993 | Ohori | 303/3 |
| 5,294,191 | 3/1994 | Giorgetti et al. | 303/152 |
| 5,401,084 | 3/1995 | Volz . | |
| 5,472,264 | 12/1995 | Klein et al. . | |

FOREIGN PATENT DOCUMENTS

| | | |
|---|---|---|
| 0 361 708 | 4/1990 | European Pat. Off. . |
| 2 545 542 | 4/1976 | Germany . |
| 3 442 909 | 5/1986 | Germany . |
| 3 541 742 | 5/1987 | Germany . |
| 3 723 916 | 1/1989 | Germany . |
| 3 900 851 | 1/1990 | Germany . |
| 3 842 370 | 6/1990 | Germany . |
| 4 029 793 | 3/1992 | Germany . |
| 4 039 661 | 6/1992 | Germany . |
| 4 124 496 | 1/1993 | Germany . |
| 4 229 041 | 3/1993 | Germany . |
| 4 133 484 | 4/1993 | Germany . |
| 4 208 581 | 5/1993 | Germany . |

*Primary Examiner*—Matthew C. Graham
*Attorney, Agent, or Firm*—Thomas N. Twomey; J. Gordon Lewis

[57]    ABSTRACT

A brake unit for motor vehicles with electric drive with a hydraulic pressure transducer and hydraulic friction brakes to increase the brake effect applied by the electric drive motor. The cooperation of the electric drive motor with the hydraulic friction brakes is controlled by an electronic controller. To increase the reliability of operation of the brake unit by making possible the buildup of hydraulic pressure in the friction brakes associated with the driven axle in the case of a failure of the electronic controller or of the entire electric system of the vehicle, the pressure transducer is arranged as a two-circuit main brake cylinder, to the first pressure space of which the friction brakes acting on the nondriven axle, and to the second pressure space of which the friction brakes acting on the driven axle are connected, wherein the connection between the second pressure space and the friction brakes acting on the driven axle is by at least one shut-off valve, which can be switched over electrically and is open in the currentless state.

17 Claims, 2 Drawing Sheets

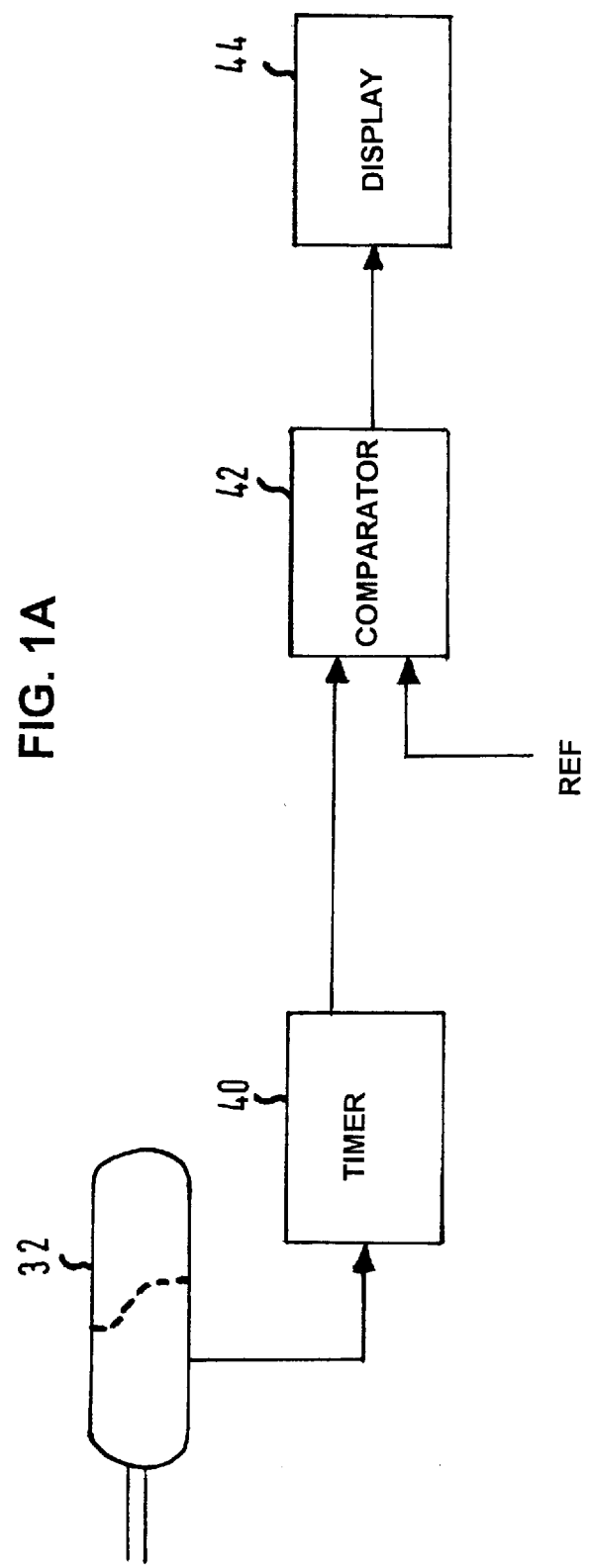

2

BRAKE UNIT FOR MOTOR VEHICLES WITH ELECTRIC DRIVE

BACKGROUND OF THE INVENTION

The present invention pertains to a brake unit for motor vehicles with electric drive and with a driven axle and a nondriven axle, comprising:

a) a brake pressure actuator, which can be actuated by means of a brake pedal and to which both the friction brakes acting on the driven axle and the friction brakes acting on the nondriven axle are connected;

b) a hydraulic energy supply unit or auxiliary pressure source, to which the friction brakes acting on the driven axle can be connected via pressure control units which can be switched over electrically;

c) an electro-regenerative brake system, which uses the electric drive motor of the motor vehicle for braking and energy recovery; and d) an electronic controller, which receives information on the state of actuation of the brake pressure actuator, the brake pressure brought about by the actuation and the velocity of the vehicle, and evaluates it for controlling both the drive motor and the friction brakes acting on the driven axle.

Such a brake unit is known from, e.g., DE-OS 41 24 496. A single-circuit, pedal-actuated main cylinder, to which the friction brakes associated with the nondriven axle are connected directly and the friction brakes associated with the driven axle are connected via a hydraulic 2/2-way valve, which is closed in the currentless state (CC), as well as a pressure control unit each, is provided in the prior-art brake unit. In addition, the friction brakes associated with the driven axle are in connection with an auxiliary hydraulic pressure source, wherein pressure sensors, which detect the pressures generated in the friction brakes, are provide. In addition, a pedal position transducer is provided for recognizing the driver's wish to brake.

The fact that no hydraulic pressure can be built up in the friction brakes associated with the driven axle in the case of a failure of the electronic controller or of the electrical system of the vehicle is felt to be a disadvantage of the prior-art brake unit. Another disadvantage is the fact that the driver's wish to brake cannot be recognized with the pressure sensor in the case of a failure of the brake circuit of the nondriven axle. The risk of an irregular braking of the two driven wheels, which can be attributed to an inequality of the pressures caused by, e.g., a permanent deviation during the individual wheel pressure regulation or by a drift of the electronic system or of the pressure sensors, e.g., because of temperature effects, cannot be considered to be particularly advantageous, either.

SUMMARY OF THE INVENTION

An object of the present invention is therefore to increase the reliability of operation of the brake unit of the class described above by making possible the buildup of a hydraulic pressure in the friction brakes associated with the driven axle in the case of failure of the electronic controller or of the entire electric system of the vehicle.

This task is accomplished according to the present invention by the brake pressure actuator being designed as a two-circuit main brake cylinder, to the first pressure space of which the friction brakes acting on the nondriven axle, and to the second pressure space of which the friction brakes acting on the driven axle are connected, wherein the connection between the second pressure space and the friction brakes acting on the driven axle is via at least one shut-off valve, which can be switched over electrically and is open in the currentless state. Due to these measures, in case of a failure of the electric or electronic system of the vehicle, both of the friction brakes associated with the driven axle, which can no longer be actuated electrohydraulically (break-by-wire), can be directly actuated by the driver. Preferably, the brake pressure actuator is designed as a tandem main brake cylinder. The entire unit (brake pedal, tandem main cylinder and wheel brakes) are designed correspondingly.

An advantageous variation of the present invention is the inclusion of a hydraulic connection, which can be shut off by means of a second shut-off valve, which can be switched over electrically, between the friction brakes acting on the driven axle. The second shut-off valve is preferably designed as a valve which is open in the currentless state (CO). Individual wheel pressure control, which is necessary in the case of ABS or ASC, is possible due to the switching of this valve. When no individual wheel pressure control becomes possible (normal case), equality of the pressures on the two wheel brakes of the driven axle is always achieved through the open second shut-off valve, so that nonuniform braking of the driven wheels due to pressure inequality is not possible.

In another advantageous embodiment of the present invention, in which pressure sensors detecting the hydraulic pressure in the friction brakes acting on the driven axle are provided, the pressure sensors are connected to the sections of the hydraulic connection which are located between the friction brakes and the second shut-off valve. As a result, both pressure sensors, which are used to control the pressure of the wheel brakes of the driven axle, can be mutually monitored in each pressure state when the second shut-off valve is closed.

It is especially advantageous if the above-mentioned pressure control units are also connected to the sections of the hydraulic connection which are located between the friction brakes and the second shut-off valve.

To perform an ABS-ASC control on the nondriven axle, another advantageous variation of the present invention provides for the hydraulic energy supply unit being formed by a two-circuit motor-pump unit, the first circuit of which can be connected to the friction brakes acting on the nondriven axle via a hydraulic valve arrangement, and the second circuit of which is connected to a high-pressure accumulator which can be connected to the friction brakes acting on the driven axle via a pressure control unit each.

A further improvement in the quality of pressure control on the driven axle is achieved in another variation of the present invention by the pressure control units being formed by current-controlled pressure relief valves.

Finally, a process for checking the ability of the hydraulic energy supply unit to operate is also suggested by and within the scope of the present invention. This process consists of measuring the charging time during each charging process of the high-pressure accumulator and comparing it with a charging time desired value, and of triggering a display in the case of a deviation from a preset difference value.

The present invention will be explained in greater detail in the following description of an exemplary embodiment, with reference to the drawing.

BRIEF DESCRIPTION OF THE DRAWING

FIG. 1A is a block diagram of a feature which can be included in the FIG. 1 brake unit.

DETAILED DESCRIPTION OF THE INVENTION

Figure 1:
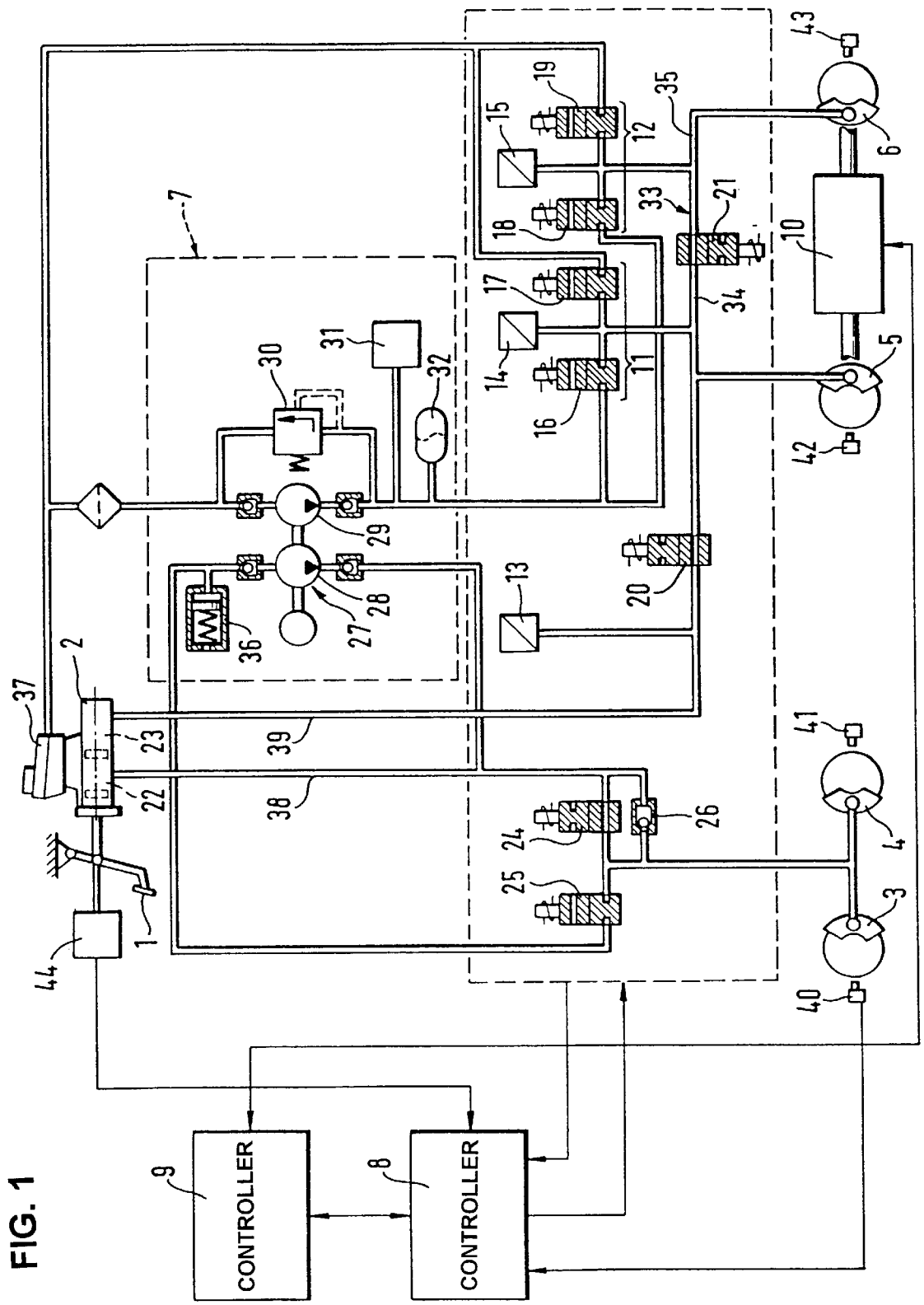
FIG. 1 is a circuit diagram of the brake unit according to the present invention.

The brake unit according to the present invention shown in the drawing is intended for a vehicle with front-wheel drive. It comprises a two-circuit brake pressure actuator or tandem main brake cylinder 2, which can be actuated by means of a brake pedal 1, and has the pressure spaces 22, 23 to which hydraulic friction brakes 3, 4, 5, 6 are connected via hydraulic lines 38, 39. The friction brakes 3, 4 connected to the first pressure space 22 are preferably associated with the wheels of the nondriven axle of the vehicle, possibly the rear axle, while the friction brakes 5, 6 connected to the second pressure space 23 act on the wheels of the front axle, which are driven by an electric drive motor 10, which is able to generate a braking moment in generator operation. The brake unit according to the present invention consequently represents a compound brake system, which makes possible regenerative and frictional braking.

The electric drive motor 10 is connected for this purpose to an electronic control device 9, to which control signals of an electronic controller 8 are sent, and electronic controller 8 controls the cooperation of the hydraulic friction brakes 5, 6 with the electric drive motor 10 according to the driver's wish to brake as a function of the output signals of a brake light switch 44, which can be actuated from the brake pedal 1, as well as of a first pressure sensor 13, which detects a hydraulic pressure, which occurs in the second pressure space 23 of the tandem main cylinder 2 and corresponds to the driver's wish. A hydraulic shut-off valve 20, which can be switched over electrically and makes possible the shutting off of the second pressure space 23 or the separation of the friction brakes 5, 6 from the tandem main cylinder 2, is preferably inserted in the hydraulic line 39.

To actuate the friction brakes 5, 6 acting on the driven axle of the vehicle or to additionally hydraulically brake the driven wheels of the front axle, a hydraulic energy supply unit or auxiliary pressure source 7 is provided, which is formed essentially by a two-circuit motor-pump unit 27. To perform ABS control on the nondriven axle of the vehicle, the first circuit 28 of the motor-pump unit 27 is connected to a valve arrangement, which is arranged upstream of the friction brakes 3, 4 and consists of an inlet valve 24, which is open in the currentless state (CO), a check valve 26 connected in parallel thereto, as well as an outlet valve 25, which is closed in the currentless state (CC), wherein the latter valve 25 is connected to a low-pressure storage reservoir 36, which is arranged on the intake side of the first pump circuit 28 and takes up the returned volume of pressurized medium in the case of ABS control.

The second circuit 29 of the motor-pump unit 27, which is connected, on the one hand, to the pressurized medium storage tank 37 arranged at the tandem main cylinder 2, is connected, on the other hand, to a hydraulic connection 33, which is arranged between the friction brakes 5, 6 of the driven axle of the vehicle and can be shut off by means of a second shut-off valve 21, which can be switched over electrically. The connection is preferably performed via a pressure control unit comprised of valve pairs 11, 12 each of which is associated with friction brake 5, 6 and connected to the sections 34, 35 of the hydraulic connection 33 which are located between the respective friction brake 5 or 6 and the second shut-off valve 21, wherein two additional pressure sensors 14, 15, which monitor the pressures generated in the friction brake 5 or 6, are connected to the same sections 34, 35. Since the second shut-off valve 21 is also designed as a valve which is open in the currentless state (CO), both pressure sensors 14, 15, which are used for pressure control on the driven axle, can be mutually monitored in each pressure state. Each of the pressure control units 11, 12 includes a pair of rapidly switching hydraulic valves 16, 17 and 18, 19, respectively, which are closed in the currentless state, and of which the valves 16 and 18 assume the function of the inlet valves, while the valves 17 and 19 are used as outlet valves.

The second circuit 29 of the motor-pump unit 27 also includes a high-pressure accumulator 32, e.g., a gas pressure accumulator, whose pressure is monitored by means of a pressure warning switch 31, and which is charged by the second stage of the motor-pump unit 27. The maximum pressure is limited by a pressure-limiting valve 30.

As shown in FIG. 1A, the operability of the hydraulic energy supply unit can be checked by measuring, with a timer 40, the charging time during each charging process of high pressure accumulator 31, comparing the charging time in a comparator 42 with a charging or reference time desired value, and triggering a display 44 when there is a deviation from a preset difference value.

If a braking process is initiated by depressing the brake pedal 1, during which, e.g., only 30% of the overall braking effect is needed, which can be supplied by the electric drive motor 10 alone, the state of actuation of the brake pedal 1 is recognized by the brake light switch 44 and is communicated to the electronic controller 8, whose control signals bring about a switching over of the first shut-off valve 20 and, as a result, a shut-off of the second pressure space 23 of the tandem main cylinder 2. Thus, a second message of the driver's wish to brake is sent by the first pressure sensor 13 to the controller 8, which calculates the desired braking moment on the front axle with the braking force distribution unit installed therein. The calculated braking moment is sent to the control device 9, which switches the electric drive motor 10 over into the braking mode, in which the motor is able to perform a braking of the driven wheels. Braking of the nondriven wheels is performed in the conventional manner by the pressure buildup in the first pressure space 22 of the tandem main cylinder 2 and via the open CO inlet valve 24 in the friction brakes 3, 4.

If the pressure sensor 13 indicates that a stronger braking effect is desired by the driver than is applied by the drive motor 10, the missing difference between the desired braking moment and the braking moment applied by the drive motor 10, which is reported back to the electronic controller 8 via the control device 9, must be set by adjusting the corresponding hydraulic pressure on the friction brakes 5, 6 of the front axle.

This happens by switching the pressure control unit 11, 12. Pressure buildup is performed by switching over the inlet valves 16, 18, which are closed in the currentless state (CC), with the outlet valves 17, 19 closed. A reduction in pressure is brought about by briefly opening the outlet valves 17, 19, which are closed in the currentless state (CC) and are arranged between the corresponding friction brake 5, 6 and the pressurized medium storage tank 37. To control the wheel brake pressure, the pressure on both driven wheels is measured by means of the pressure sensors 14, 15, whose signals are processed in the electronic controller 8. To adjust the desired pressure curve, both inlet and outlet valves 16, 18, 17, 19 are operated as rapidly switching control valves in the open and closed positions, wherein the switching times are in the millisecond range. The maximum pressure gradient is limited by the flow resistance of the open valves 16, 17, 18, 19.

To obtain flat pressure increase and pressure decrease gradients on the driven axle of the vehicle, both friction brakes 5, 6 acting on the front axle are actuated simultaneously by only one pressure control unit 11 or 12 in the normal braking case, while the other pressure control unit 12 or 11 remains in the pressure-keeping state. In contrast, steep pressure increase and decrease gradients are obtained when both friction brakes are actuated simultaneously by both pressure control units 11, 12.

An alternative pressure control, which is characterized by a continuously variable pressure increase and decrease, can be achieved with slightly modified inlet and outlet valves 16, 17, 18, 19, in which an adjustable overpressure characteristic is generated via the electric energizing current.

The second shut-off valve 21, which is open in the currentless state (CO), and which is inserted in the hydraulic connection 33 between the two friction brakes 5, 6, remains open, as a result of which pressure equalization is possible between the friction brakes 5, 6.

ABS control is performed as a three-channel control (front axle: two-channel, rear axle: single channel) with four wheel speed sensors 40, 41, 42, 43, and the brake pressure modulation on the rear axle is performed according to the "select low" principle.

If one wheel of the driven front axle tends to lock, the braking moment requirement on the electric drive motor 10 is taken back by the electronic controller 8, and the ABS control is taken over by the friction brakes 5, 6. For this to occur, the second shut-off valve 21 is closed in order to make possible an individual wheel pressure control.

If one of the driven wheels tends to spin during the drive of the vehicle, both shut-off valves 20, 21 are closed in order to perform the ASC control of the individual wheels with the hydraulically actuated friction brakes 5, 6. If the second wheel also tends to spin, a corresponding driving torque reduction is requested by the control device 9.

In case of failure of the electronic/electric system, all valves enter the currentless state. Both of the friction brakes 5, 6 associated with the driven axle of the vehicle are connected now to the tandem main cylinder 2, so that the legal regulations imposed concerning the failure of the electronic system are satisfied.

The legally required braking effect can always be reached with the second circuit in case of a hydraulic failure of one brake circuit. In case of failure of the hydraulic circuit 38 associated with the rear axle, due to the arrangement of the first pressure sensor 13 in the second brake circuit 39 the "break-by-wire" braking effect is reached via the driven front axle.

In case of a hydraulic failure of the brake circuit 39 associated with the front axle, the driver can reach the braking effect via the circuit 38 associated with the nondriven rear axle.

We claim:

1. Brake unit for motor vehicles with an electric drive motor and with a driven axle and a nondriven axle, comprising
   a) a two-circuit brake pressure actuator, which can be actuated by means of a brake pedal, and to which friction brakes acting on the driven axle as well as on the nondriven axle are connected;
   b) an electro-regenerative brake system, which uses the electric drive motor of the motor vehicle for braking and energy recovery; and
   c) an electronic controller, which receives information on the state of actuation of said brake pressure actuator, the brake pressure brought about by the actuation, and the velocity of the vehicle, and evaluates it for controlling both the electric drive motor and said friction brakes acting on the driven axle, characterized in that:
   (a) said friction brakes acting on the nondriven axle are connected to a first pressure space of said brake pressure actuator, and said friction brakes acting on the driven axle are connected to a second pressure space of said brake pressure actuator, wherein the connection between said second pressure space and said friction brakes acting on the driven axle is performed via at least one shut-off valve, which can be switched over electrically and is open in the currentless state, and said friction brakes acting on the driven axle can be connected to a hydraulic energy supply unit or auxiliary pressure source via pressure control units, which can be switched over electrically; and
   (b) a hydraulic connection, which can be shut off by means of a second shut-off valve, which can be switched over electrically, is provided between said friction brakes acting on the driven axle.

2. Brake unit in accordance with claim 1, characterized in that said brake pressure actuator is designed as a tandem main brake cylinder.

3. Brake unit in accordance with claim 2, characterized in that a pressure sensor, responsive to actuation of the brake unit, is connected to said second pressure space of said tandem main brake cylinder.

4. Brake unit in accordance with claim 1, characterized in that said second shut-off valve is designed as a valve which is open in the currentless state.

5. Brake unit in accordance with claim 1, wherein pressure sensors detecting the hydraulic pressure in the friction brakes acting on the driven axle are provided, characterized in that said pressure sensors are connected to sections of said hydraulic connection, which are located between said friction brakes and said second shut-off valve.

6. Brake unit in accordance with claim 5, characterized in that said pressure control units are connected to said sections of said hydraulic connection which are located between said friction brakes and said second shut-off valve.

7. Brake unit in accordance with claim 6, characterized in that said pressure control units are formed by current-controlled pressure relief valves.

8. A brake unit for a motor vehicle having an electric drive motor, a driven axle and a nondriven axle, said brake unit comprising:
   a brake pedal;
   a brake pressure actuator actuated by said brake pedal and having a first pressure space and a second pressure space;
   a first pair of friction brakes adapted to act on the driven axle;
   first connecting means for connecting said first pair of friction brakes to said second pressure space of said brake pressure actuator, said first connecting means including at least one electrically switchable shut-off valve which is open in the currentless state, a hydraulic connection between said friction brakes acting on the driven axle, and a second electrically switchable shut-off valve for closing said hydraulic connection;
   a second pair of friction brakes adapted to act on the nondriven axle and connected to said first pressure space of said brake pressure actuator;

a hydraulic energy supply unit;

second connecting means for connecting said second pair of friction brakes to said hydraulic energy supply unit, said second connecting means including first and second electrically switchable pressure control units;

an electro-regenerative brake system for braking and energy recovery; and an electronic controller responsive to information on:
  (a) the state of actuation of the said brake pressure actuator,
  (b) the brake pressure brought about by the actuation, and
  (c) the velocity of the vehicle,
for evaluating said information and for controlling:
  (a) said friction brakes acting on the driven axle, and
  (b) the electric drive motor to actuate said electro-regenerative brake system.

9. A brake unit according to claim 8 wherein said brake pressure actuator is a tandem main brake cylinder.

10. A brake unit according to claim 9 further including a pressure sensor connected to said second pressure space of said tandem main brake cylinder for sensing actuation of said brake pedal.

11. A brake unit according to claim 8 wherein said second shut-off valve is open in the currentless state.

12. A brake unit according to claim 8 wherein said hydraulic connection has first and second sections respectively located between said second shut-off valve and said friction brakes acting on the driven axle and said brake unit further includes pressure sensors connected to said sections of said hydraulic connection between said second shut-off valve and said friction brakes acting on the driven axle for detecting hydraulic pressure in the friction brakes acting on the driven axle.

13. A brake unit according to claim 12 wherein said pressure control units are connected to said sections of said hydraulic connection which are located between said second shut-off valve and said friction brakes acting on said driven axle.

14. A brake unit according to claim 13 wherein said pressure control units include current-controlled pressure relief valves.

15. A process for checking the ability of a hydraulic energy supply unit to operate in a brake unit of a motor vehicle having an electric drive motor, a driven axle, and a nondriven axle, and said brake unit having:

a brake pedal, a brake pressure actuator actuated by said brake pedal and having a first pressure space and a second pressure space, a first pair of friction brakes adapted to act on the driven axle, first connecting means for connecting said first pair of friction brakes to said second pressure space of said brake pressure actuator, said first connecting means including at least one electrically switchable shut-off valve which is open in the currentless state, a second pair of friction brakes adapted to act on the nondriven axle and connected to said first pressure space of said main brake cylinder, a hydraulic energy supply unit including:
  (a) a first circuit,
  (b) a hydraulic valve arrangement for connecting said first circuit to said friction brakes acting on the nondriven axle,
  (c) a second circuit, and
  (d) a high-pressure accumulator connected to said friction brakes acting on the driven axle by said pressure control units, second connecting means for connecting said second pair of friction brakes to said hydraulic energy supply unit, said second connecting means including first and second electrically switchable pressure control units, an electro-regenerative brake system for braking and energy recovery, and an electronic controller responsive to information on:
  (a) the state of actuation of the said brake pressure actuator,
  (b) the brake pressure brought about by the actuation, and
  (c) the velocity of the vehicle,
for evaluating said information and for controlling:
  (a) said friction brakes acting on the driven axle, and
  (b) the electric drive motor to actuate said an electro-regenerative brake system,
said process including the steps of:
  (a) measuring the charging time during each charging process,
  (b) comparing the measured charging time with a predetermined desired charging time, and
  (c) displaying a deviation of the difference between the measured charging time and the predetermined desired charging time from a preset difference.

16. Brake unit for motor vehicles with an electric drive motor and with a driven axle and a nondriven axle, comprising a) a two-circuit brake pressure actuator, which can be actuated by means of a brake pedal, and to which friction brakes acting on the driven axle as well as on the nondriven axle are connected;

b) an electro-regenerative brake system, which uses the electric drive motor of the motor vehicle for braking and energy recovery; and c) an electronic controller, which receives information on the state of actuation of said brake pressure actuator, the brake pressure brought about by the actuation, and the velocity of the vehicle, and evaluates it for controlling both the electric drive motor and said friction brakes acting on the driven axle, characterized in that:

(a) said friction brakes acting on the nondriven axle are connected to a first pressure space of said brake pressure actuator, and said friction brakes acting on the driven axle are connected to a second pressure space of said brake pressure actuator, wherein the connection between said second pressure space and said friction brakes acting on the driven axle is performed via at least one shut-off valve, which can be switched over electrically and is open in the currentless state, and said friction brakes acting on the driven axle can be connected to a hydraulic energy supply unit or auxiliary pressure source via pressure control units, which can be switched over electrically; and (b) said hydraulic energy supply unit is formed by a two-circuit motor-pump unit, the first circuit of which is connected to said friction brakes acting on the nondriven axle via a hydraulic valve arrangement, and the second circuit of which is connected to a high-pressure accumulator, which is connected to said friction brakes acting on the driven axle via said respective pressure control units.

17. A brake unit for a motor vehicle having an electric drive motor, a driven axle and a non-driven axle, said brake unit comprising:

a brake pedal;

a brake pressure actuator actuated by said brake pedal and having a first pressure space and a second pressure space;

a first pair of friction brakes adapted to act on the driven axle;

first connecting means for connecting said first pair of friction brakes to said second pressure space of said brake pressure actuator, said first connecting means including at least one electrically switchable shut-off valve which is open in the currentless state;

a second pair of friction brakes adapted to act on the nondriven axle and connected to said first pressure space of said brake pressure actuator;

a hydraulic energy supply unit including a two-circuit motor-pump unit comprising:
  (a) a first circuit,
  (b) a hydraulic valve arrangement for connecting said first circuit to said friction brakes acting on the nondriven axle,
  (c) a second circuit, and
  (d) a high-pressure accumulator connected to said friction brakes acting on the driven axle by pressure control units;

second connecting means for connecting said second pair of friction brakes to said hydraulic energy supply unit, said second connecting means including first and second electrically switchable pressure control units;

an electro-regenerative brake system for braking and energy recovery; and an electronic controller responsive to information on:
  (a) the state of actuation of the said brake pressure actuator,
  (b) the brake pressure brought about by the actuation, and
  (c) the velocity of the vehicle, for evaluating said information and for controlling:
  (a) said friction brakes acting on the driven axle, and
  (b) the electric drive motor to actuate said electro-regenerative brake system.

* * * * *